US 11,773,932 B2

(12) United States Patent
Fumagalli et al.

(10) Patent No.: US 11,773,932 B2
(45) Date of Patent: Oct. 3, 2023

(54) PAD RETURN SPRING FOR A DISC BRAKE CALIPER BODY

(71) Applicant: BREMBO S.p.A., Curno (IT)

(72) Inventors: Marco Fumagalli, Curno (IT); Mauro Mambretti, Curno (IT); Andrea Mecocci, Curno (IT); Alberto Pendesini, Curno (IT)

(73) Assignee: Brembo S.p.A., Bergamo (IT)

( * ) Notice: Subject to any disclaimer, the term of this patent is extended or adjusted under 35 U.S.C. 154(b) by 305 days.

(21) Appl. No.: 17/415,549

(22) PCT Filed: Dec. 19, 2019

(86) PCT No.: PCT/IB2019/061094
§ 371 (c)(1),
(2) Date: Jun. 17, 2021

(87) PCT Pub. No.: WO2020/128946
PCT Pub. Date: Jun. 25, 2020

(65) Prior Publication Data
US 2022/0056969 A1 Feb. 24, 2022

(30) Foreign Application Priority Data
Dec. 20, 2018 (IT) .................. 102018000020401

(51) Int. Cl.
*F16D 65/097* (2006.01)
*F16D 55/22* (2006.01)
(Continued)

(52) U.S. Cl.
CPC ......... *F16D 65/0972* (2013.01); *F16D 55/22* (2013.01); *F16D 55/228* (2013.01);
(Continued)

(58) Field of Classification Search
CPC ............. F16D 65/0075; F16D 65/0972; F16D 2055/002; F16D 2127/02; F16D 55/22; F16D 55/228
(Continued)

(56) References Cited

U.S. PATENT DOCUMENTS 9,400,025 B2    7/2016  Maestrini et al.
9,970,495 B2    5/2018  Crippa et al.
(Continued)

FOREIGN PATENT DOCUMENTS

EP        3175134 B1     3/2018
WO   WO 2008/075386 A1  6/2008
(Continued)

OTHER PUBLICATIONS

European Patent Office, International Search Report with Written Opinion, issued in PCT/IB2019/061094, 13 pages, dated Mar. 9, 2020, European Patent Office, Rijswijk, Netherlands.

*Primary Examiner* — Christopher P Schwartz
(74) *Attorney, Agent, or Firm* — Marshall & Melhorn, LLC

(57) ABSTRACT

A pad return spring for a caliper body. The caliper body has an elongated element connecting bridge connecting a first elongated wheel-side element to a second elongated wheel-side element and having a middle connecting bridge defining an outer middle bridge side, an inner middle bridge side, a middle bridge disc inlet side, and an opposite middle bridge disc outlet side. The pad return spring has a first and a second pad retraction elements, each defining a middle stretch, a first side stretch influencing the first pad, and an opposite second side stretch influencing the second pad to move the first and second pads away from the first and second braking surfaces at the end of a braking action, and an elongated connecting element connecting the first and second pad retraction elements to each other, and an anchoring device to removably restrain the pad return spring to the middle connecting bridge.

22 Claims, 12 Drawing Sheets

(51) Int. Cl.
    *F16D 55/228*     (2006.01)
    *F16D 65/00*      (2006.01)
    F16D 55/00        (2006.01)
    F16D 127/02       (2012.01)
(52) U.S. Cl.
    CPC .... *F16D 65/0075* (2013.01); *F16D 2055/002* (2013.01); *F16D 2127/02* (2013.01)
(58) Field of Classification Search
    USPC .......................................... 188/73.36–73.38
    See application file for complete search history.

(56) References Cited

U.S. PATENT DOCUMENTS

| | | | |
|---|---|---|---|
| 11,401,990 B2* | 8/2022 | D'Alessio | F16D 55/228 |
| 2017/0037916 A1* | 2/2017 | Crippa | F16D 55/2265 |
| 2018/0328427 A1 | 11/2018 | Scotti et al. | |
| 2023/0109487 A1* | 4/2023 | Crippa | F16D 65/0972 188/73.38 |

FOREIGN PATENT DOCUMENTS

| WO | WO 2017/085619 A1 | 5/2017 |
|---|---|---|
| WO | WO 2018/116088 A1 | 6/2018 |

* cited by examiner

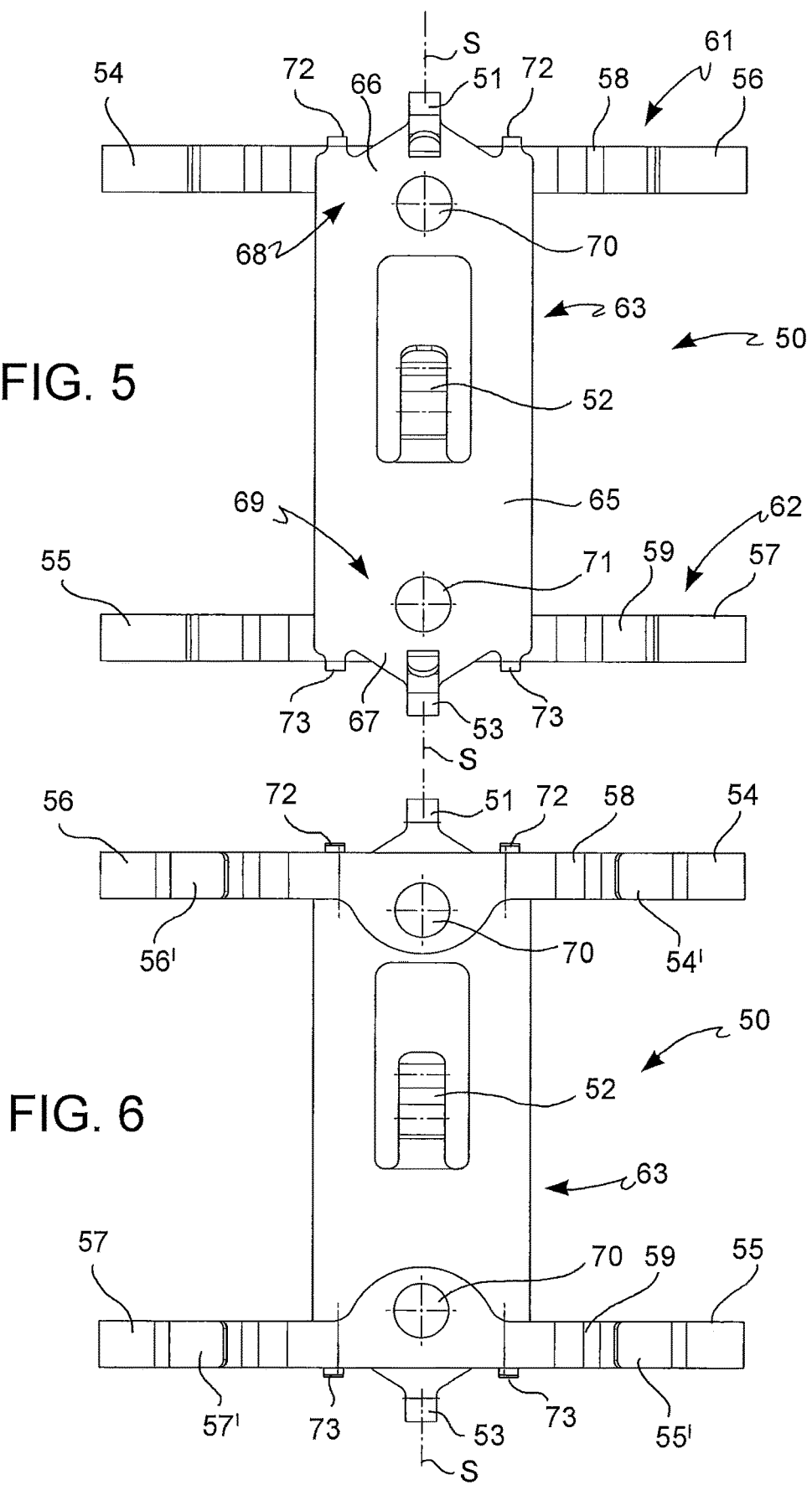

PAD RETURN SPRING FOR A DISC BRAKE CALIPER BODY

CROSS-REFERENCE TO RELATED APPLICATIONS

This application is a National Phase Application of PCT International Application No. PCT/IB2019/061094, having an International Filing Date of Dec. 19, 2019 which claims priority to Italian Application No. 102018000020401 filed Dec. 20, 2018, each of which is hereby incorporated by reference in its entirety.

FIELD OF THE INVENTION

The present invention relates to a caliper return spring and a disc brake caliper comprising such a spring.

In particular, the disc brake caliper body in a disc brake caliper body of fixed type does not slide with respect to a support thereof and is adapted to straddle a floating-type brake disc, also known as sliding on a support thereof so as to modify the position thereof along a direction which is coaxial thereto in order to move close to or away from at least one brake pad. Said brake disc has a first braking surface of brake disc and an opposite second braking surface of brake disc. Such a caliper body of fixed type comprises a first elongated wheel-side element, i.e. facing the vehicle wheel, comprising an outer caliper side of first elongated element and an inner caliper side of first elongated element, in which said outer caliper side of first elongated element is adapted to face the vehicle wheel. Said caliper body has at least one portion of the inner caliper side of first elongated element adapted to face said axially sliding first braking surface of brake disc.

Said caliper body further comprises a second elongated opposite wheel-side element which has an outer caliper side of second elongated element and an inner caliper side of second elongated element. At least one portion of the inner caliper side of second elongated element is adapted to face said second braking surface of brake disc.

Said first elongated wheel-side element comprises at least one thrust means seat adapted to receive thrust means which are suitable for influencing a first pad against said first braking surface of brake disc, brake disc which being floating, in turn abuts against an opposite second pad by means of the second braking surface thereof, to exert a braking action on the vehicle.

Said first elongated wheel-side element comprises at least one sliding element adapted to slide relative to said first pad influenced by the thrust means with respect to said caliper body.

Said second elongated opposite wheel-side element comprises at least one pad resting surface adapted to at least partially rest the second opposite pad firmly on the caliper body, avoiding this second pad from being influenced by any thrust means which is movable with respect to the caliper body itself.

Said caliper body comprises at least one elongated element connecting bridge, a bridge adapted to connect said first elongated wheel-side element to said second elongated opposite wheel-side element so as to be suitable for straddling said brake disc.

BACKGROUND ART

The brake caliper in a disc brake generally is arranged straddling the peripheral outer margin of a brake disc, adapted to rotate about a rotation axis defining an axial direction (X-X). A radial direction (R-R) is also defined in a disc brake, which radial direction substantially is orthogonal to said axial direction (X-X), and a tangential or circumferential direction (C-C), which is orthogonal both to said axial direction (X-X) and to said radial direction (R-R).

Brake pads generally comprise a plate on which there is fastened a friction material adapted to press against a facing braking surface of the brake band of the brake disc. The plate may comprise acoustic wear signalers, sometimes embedded in the friction material, which serve the function of emitting a sound by rubbing against the brake band of the disc when the friction material has thinned axially due to prolonged use. The axial (X-X), radial (R-R) and tangential (C-C) or circumferential (C-C) directions are intended to be defined on a brake pad, also when it is considered alone.

Typically, the body of the caliper is made of metal such as for example aluminum, or aluminum alloy, for example aluminum and lithium, or of steel, and may be obtained by melting, but also by mechanical machining, as well as by forging. The body of the caliper may be produced in one piece, or monoblock, so as to reduce the number of components to be assembled, and in particular to manufacture the whole body of the caliper with a single casting operation when obtained by melting. Alternatively, the body of caliper may also be made in two half-calipers which are associated with each other by means of fastening means, for example threaded fastening means, along a plane which typically coincides with the median plane of the disc on which the caliper is arranged straddling.

Brake calipers are restrained to a support structure which remains stationary with respect to the wheel of the vehicle, such as for example a journal of a suspension of a vehicle or a hub of a vehicle wheel or a fork or a swingarm of a motor vehicle. The brake caliper usually comprises a caliper body having two elongated portions arranged so as to face opposite braking surfaces of a brake disc, and at least one bridge which connects said two elongated portions to each other.

In floating caliper bodies associated with fixed discs, a floating portion of the caliper body has a cylinder or cylinders adapted to house hydraulic pistons capable of exerting a thrust action on the clutch pad facing it, abutting it against the braking surface of the disc, while it slides on the bracket, or fixed portion of the caliper, and acts on the second clutch pad, abutting it against the brake disc to exert the braking action on the motor vehicle.

In fixed caliper bodies associated with fixed discs, there is a cylinder or cylinders in both opposite sides of the caliper body, which cylinder or cylinders are adapted to house hydraulic pistons capable of exerting a thrust action on the clutch pad facing it, abutting it against the braking surface of the disc, without the need to axially move the brake disc, abutting both the opposite brake pads against the opposite braking surfaces of the brake disc to exert the braking action on the motor vehicle.

Differently, caliper bodies are also known which are associated with floating discs, where one of the elongated portions of the caliper body alone has a cylinder or cylinders adapted to house hydraulic pistons capable of exerting a thrust action on the clutch pad facing it, abutting it against the braking surface of the disc, which in turn slides axially on the support thereof and abuts against the second clutch pad to exert the braking action on the motor vehicle.

The braking action on a vehicle exerts a significant friction adapted to create the desired braking torque on the vehicle itself, braking torque which however simultaneously stresses, deforming the caliper body itself away from the brake disc. This phenomenon is known as elastic deformation or "break" of the caliper which moving away from the brake disc, obligates a further influence of the hydraulic pistons on the pad to exert the desired braking action.

The caliper body returns to its undeformed resting configuration at the end of the braking action, and therefore at the end of the thrusting which deforms the caliper body away from the brake disc, moving close to the brake disc again, and therefore moving the pads close to the braking surfaces.

The pads moving close to the brake disc is undesired since it causes a contact, albeit a slight contact, between pad and disc, which causes a continuous slight friction and therefore a braking action, known as residual braking torque, also at the end of the braking control by the vehicle or motor vehicle driver.

This residual braking torque often is considered undesired since it generates noise, albeit slight noise, caused by the friction action between pads and braking surfaces of the disc, an undesired wear of the pads and of the brake disc, which results in more frequent maintenance for the replacement thereof, and a minimum consumption of fuel for feeding the drive unit also of the albeit minimum energy required to overcome this residual torque.

For such a reason, it is known to provide the calipers with springs which exert an axial thrust action on the pads away from the brake disc. Obviously in braking step, such a thrust action to move away is overcome by the thrust action exerted by the pistons but in release step, said springs exert a sufficient thrust in axial direction to move the pads away from the braking surfaces of the brake disc, avoiding the contact between the pads and the brake disc when no braking action is required.

Such springs are designed to apply a preset return force to the pads, away from the friction surfaces of the disc at the end of a braking action.

In order to ensure the application of such a preset return force, the known springs have a volume which forces a compartment to be obtained in the caliper body, the compartment having dimensions adapted to contain them without hindering the operation thereof.

Therefore, the need is felt to reduce the total volume of the pad return spring, avoiding to reduce the design load of the spring, and therefore the force which can be applied to the pads by such a spring to move them away from the friction surfaces of the disc at the end of a braking action.

Moreover, during the pad assembly or replacement operations, there is a need to elastically deform the spring to allow the insertion or removal of the pads in/from the operating seat or position thereof.

Therefore, the spring is to be designed so that during such operations, it is elastically stressed with an effort which is less than the yielding limit of the spring itself, in order to avoid damaging it.

Therefore two opposing needs are felt, which are the reduction of the volume of the spring without reducing the design load during use, and avoiding the risk of exceeding the yielding limit of the spring during the pad assembly or replacement operations.

The known pad return springs do not allow the aforesaid contrasting needs to be simultaneously met.

SOLUTION

It is the object of the present invention to devise and provide a pad return spring which allows to provide a solution to the aforesaid needs and at least partially obviate the drawbacks indicated above with reference to the known art.

In particular, it is the task of the present invention to provide a pad return spring which allows to reduce the volume of the spring without reducing the design load during use, while avoiding the risk of exceeding the yielding limit of the spring during the pad assembly or replacement operations.

Therefore, it is a further object to reduce the residual braking torque of the caliper, reduce the noise of the disc brake in the absence of braking, and reduce the wear of the pads and of the brake disc.

These and other objects are achieved by a pad return spring and a disc brake caliper as described and claimed herein.

Certain advantageous embodiments are the subject of the dependent claims.

Due to the provision of a pad return spring according to the claims, the need to decrease the dimensions of the pad return spring by using several overlapping sheets without varying the design load is met.

Moreover, the use of several sheet layers for manufacturing the pad return spring allows to decrease the width of the spring itself, while keeping the total thickness thereof unaltered.

Moreover, a pad return spring is thus provided, with reduced dimensions but with the same design load and stress below the yielding limit of the material of which the spring is made.

Given that the sheet layers have a smaller thickness than the corresponding thicknesses of a traditional pad return spring, their use allows to increase the elasticity of the spring, thus avoiding the risk during assembly of exceeding the yielding limit of the material of which the pad return spring is made.

Indeed, despite the load generated by a single sheet layer being reduced with respect to the design load, the overlapping of a plurality of sheet layers globally allows the aforesaid design load to be obtained, with the advantage of an improved flexibility and less volume.

Due to the overlapping of a plurality of sheet layers, a pad return spring is provided, which allows to reduce the volume of the spring without reducing the design load during use, while avoiding the risk of exceeding the yielding limit of the spring during the pad assembly or replacement operations.

The solutions suggested may be applied to a fixed caliper body, as well as to a floating caliper body.

DRAWINGS

Further features and advantages of the caliper body will become apparent from the description given below of preferred embodiments thereof, given by way of non-limiting examples, with reference to the accompanying drawings, in which:

FIG. 5 is a top view of the caliper return spring in FIG. 1;

FIG. 6 is a bottom view of the caliper return spring in FIG. 1;

DESCRIPTION OF SOME PREFERRED EMBODIMENTS

Figure 1:
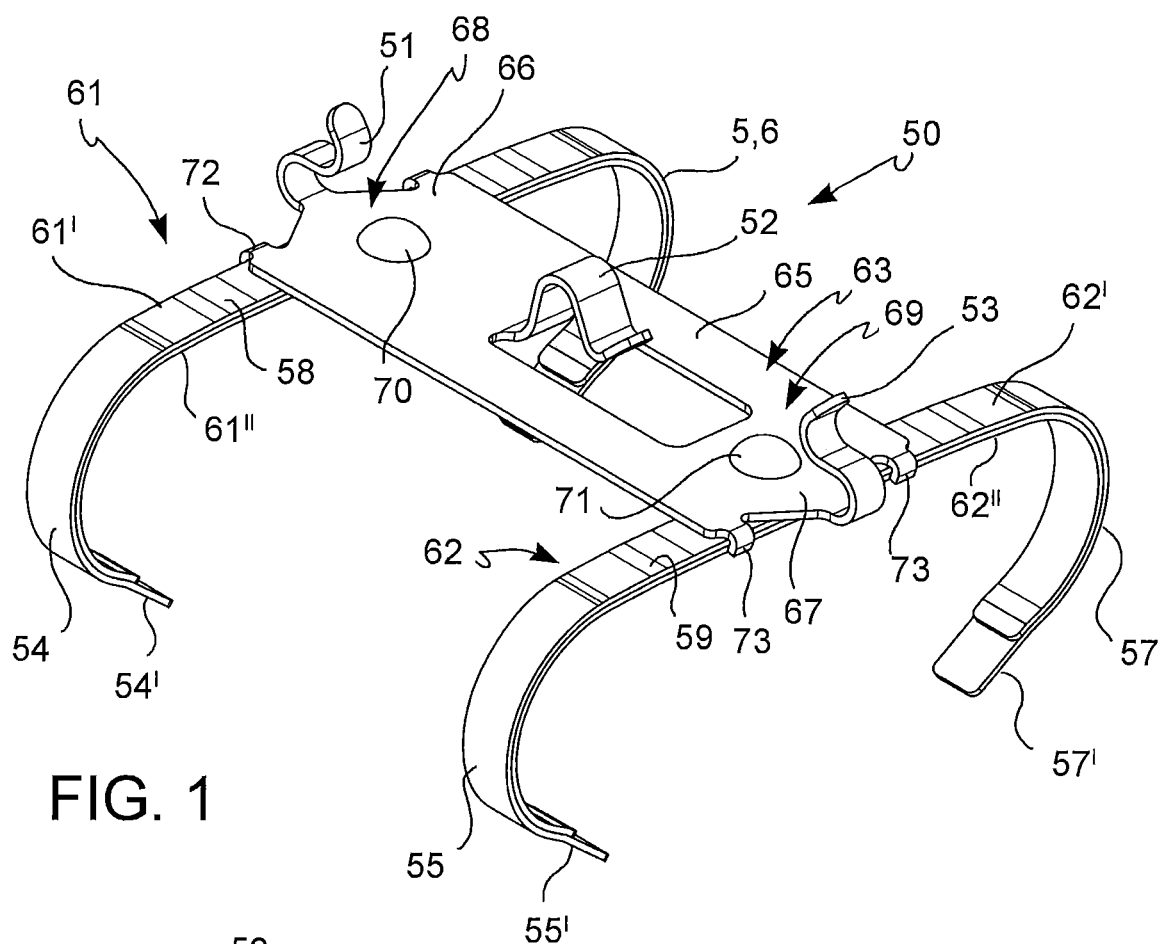
FIG. 1 is a top axonometric view of a caliper return spring according to the invention.
Figure 2:
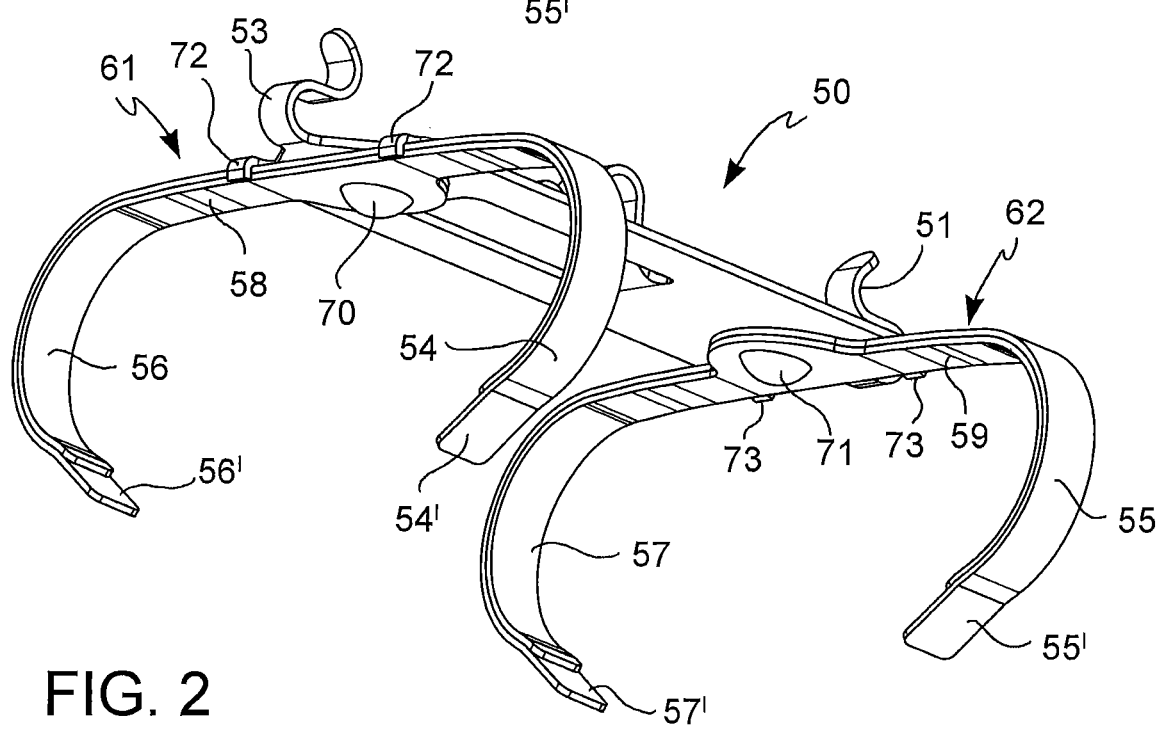
FIG. 2 is a bottom axonometric view of the caliper return spring in FIG. 1.
Figure 3:
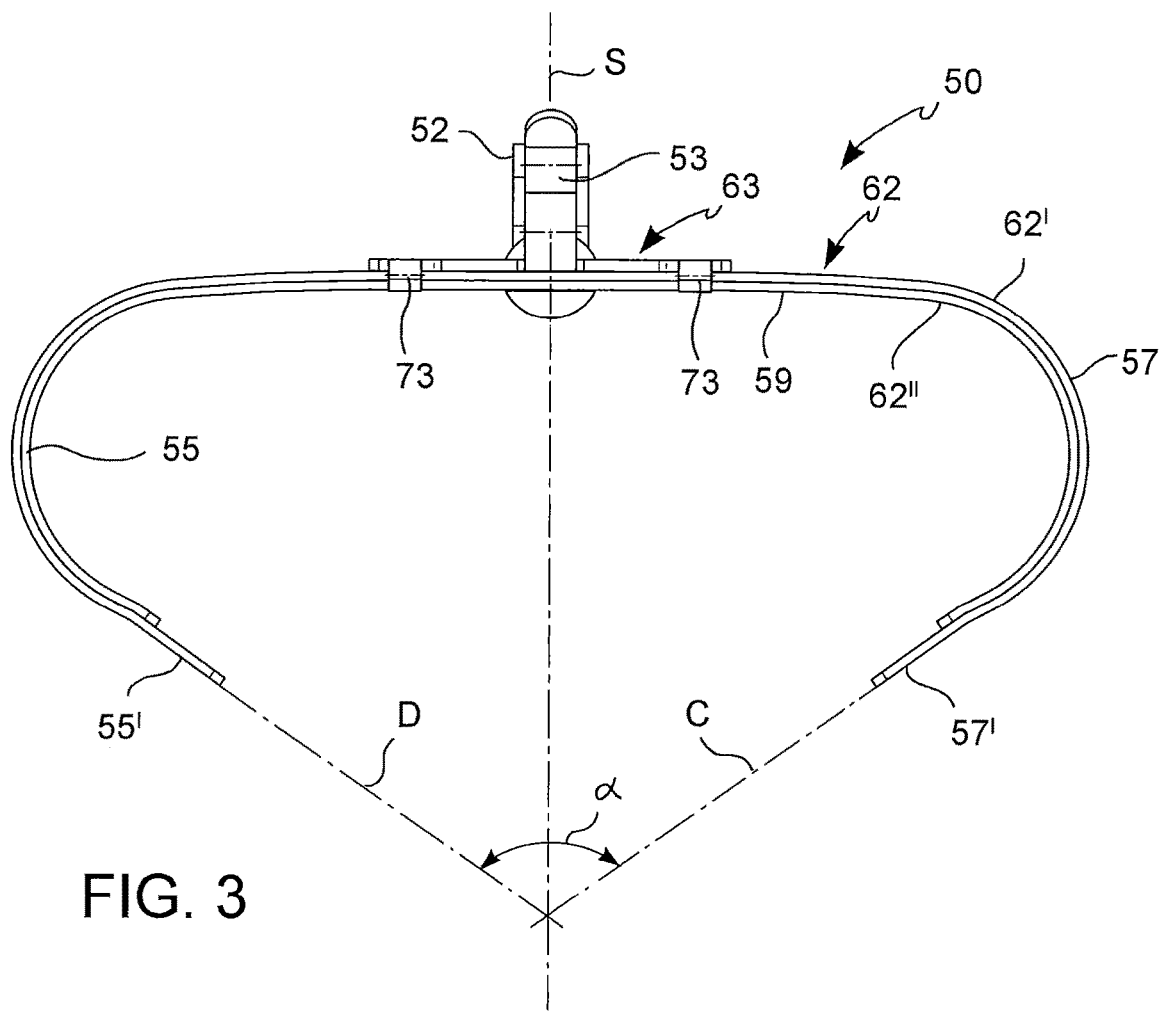
FIG. 3 is a front view of the caliper return spring in FIG. 1.
Figure 4:
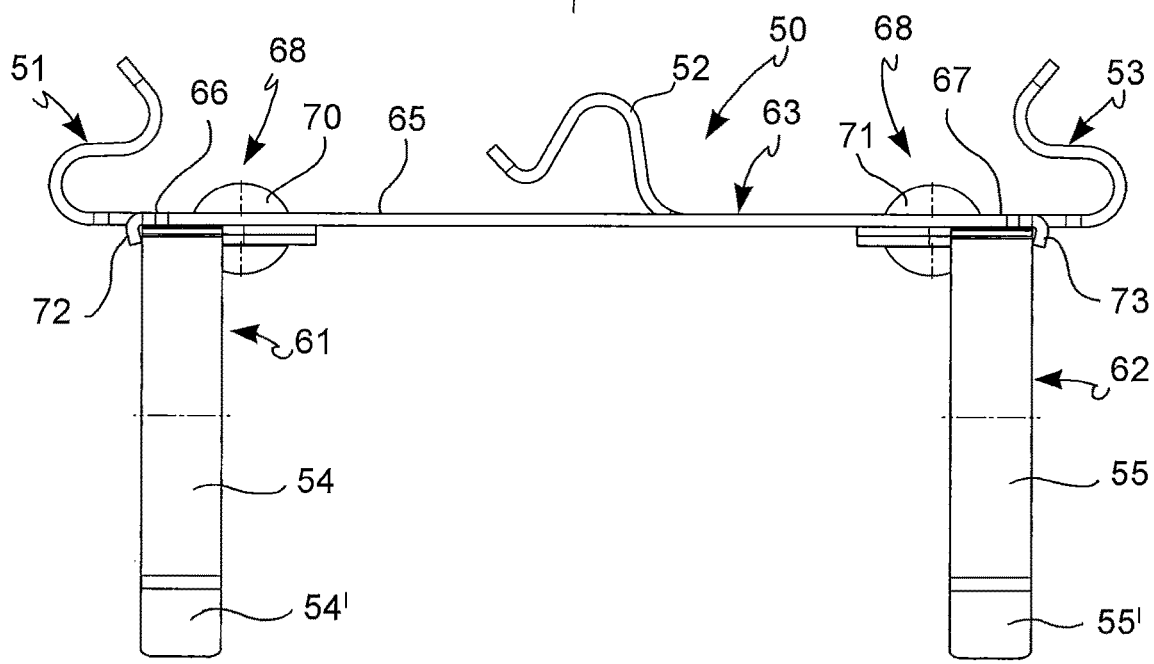
FIG. 4 is a side view of the caliper return spring in FIG. 1.
Figure 7:
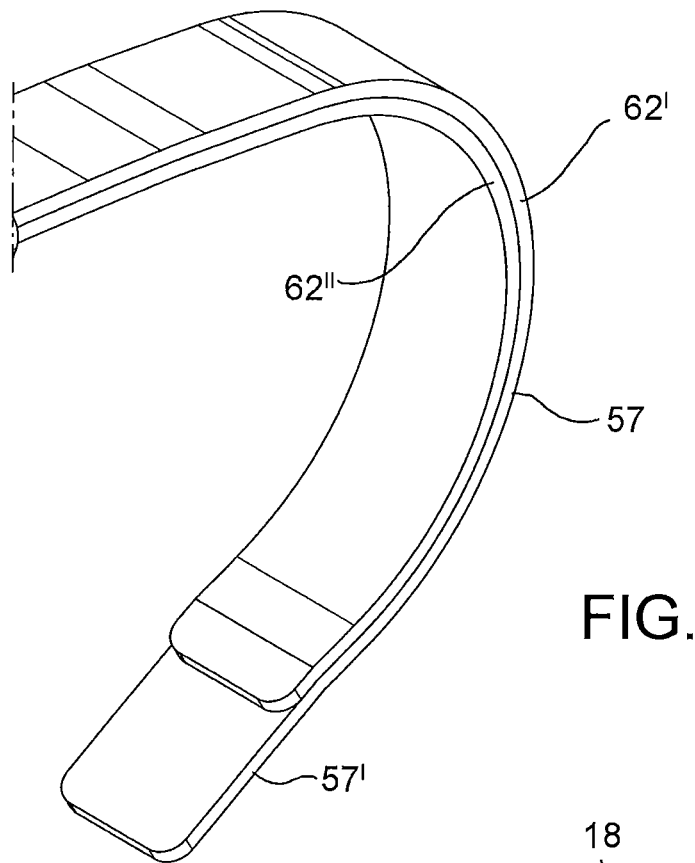
FIG. 7 shows a partial axonometric view of a side stretch of a pad retraction element of the spring in FIG. 1.
Figure 8:
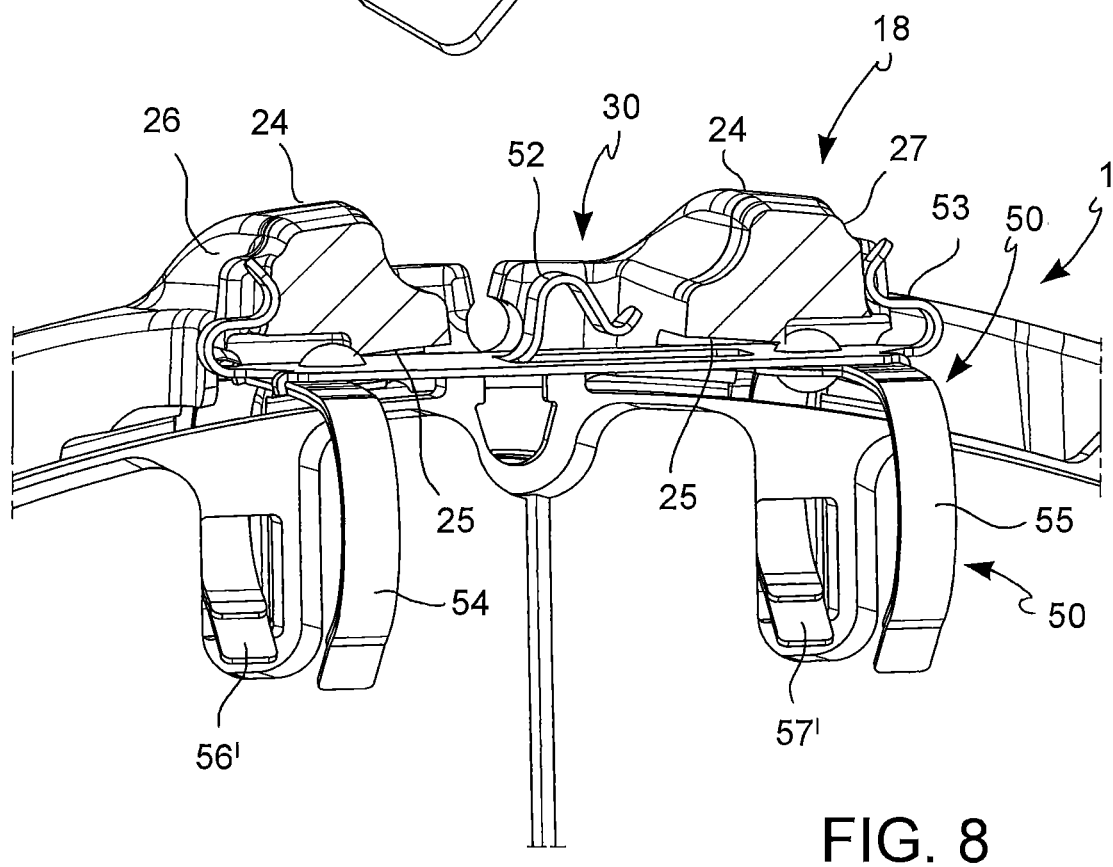
FIG. 8 shows a partial sectional view of an assembly of pad return spring in FIG. 1 and a caliper body, in which the pad return spring is restrained to a middle connecting bridge of the caliper body.
Figure 9:
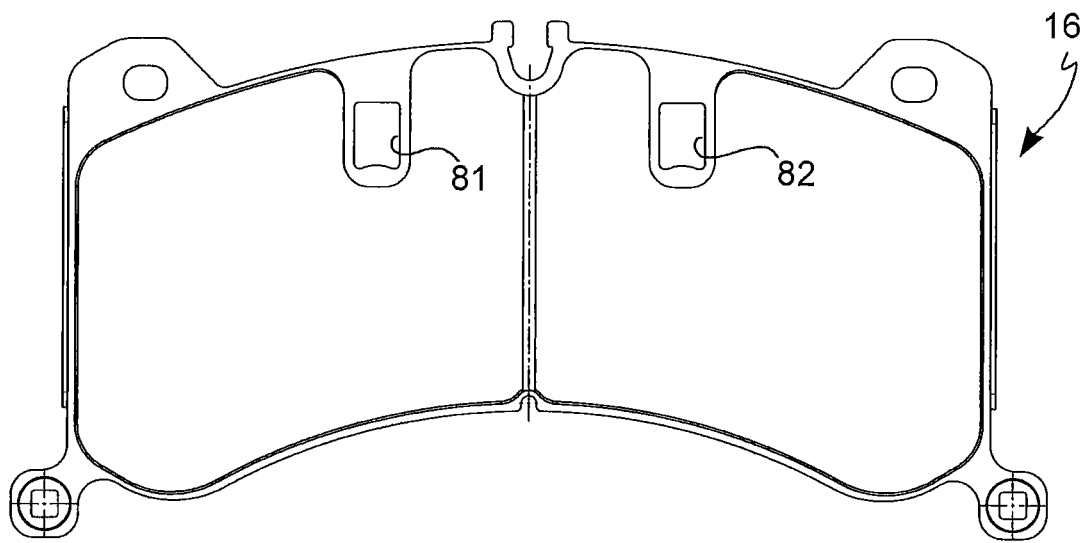
FIG. 9 shows a front view of a pad configured to be actuated by the pad return spring in FIG. 1.
Figure 10:
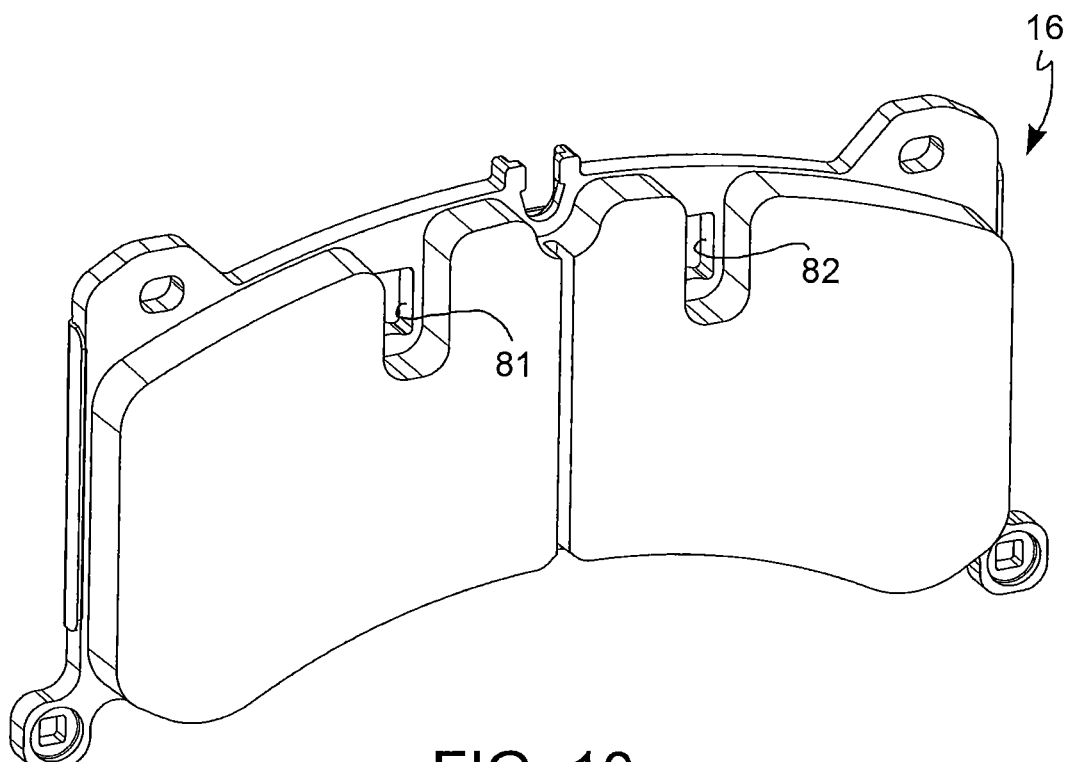
FIG. 10 shows an axonometric view of the pad in FIG. 9.
Figure 11:
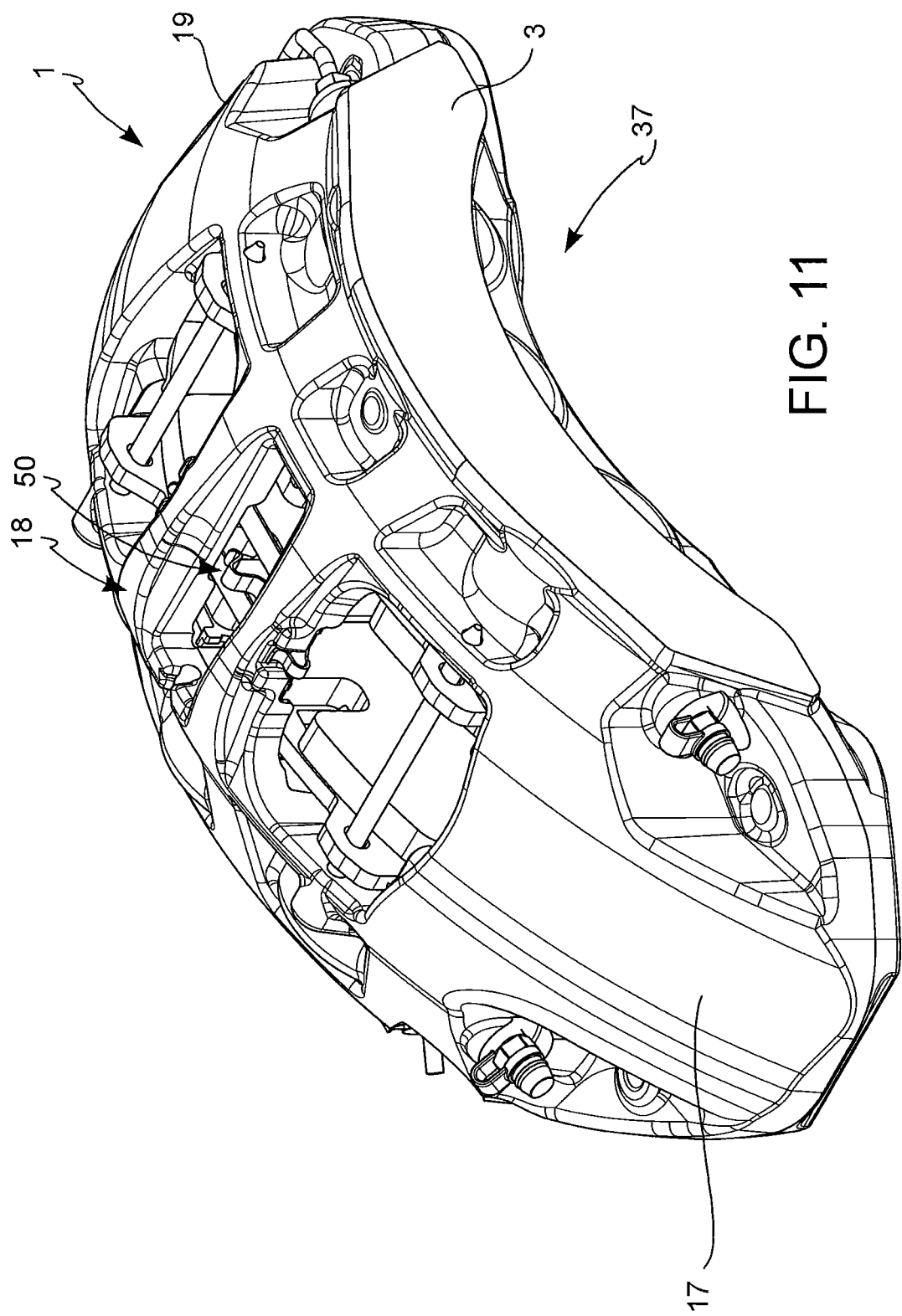
FIG. 11 shows an axonometric view of a brake caliper according to the invention, comprising the caliper return spring in FIG. 1.
Figure 12:
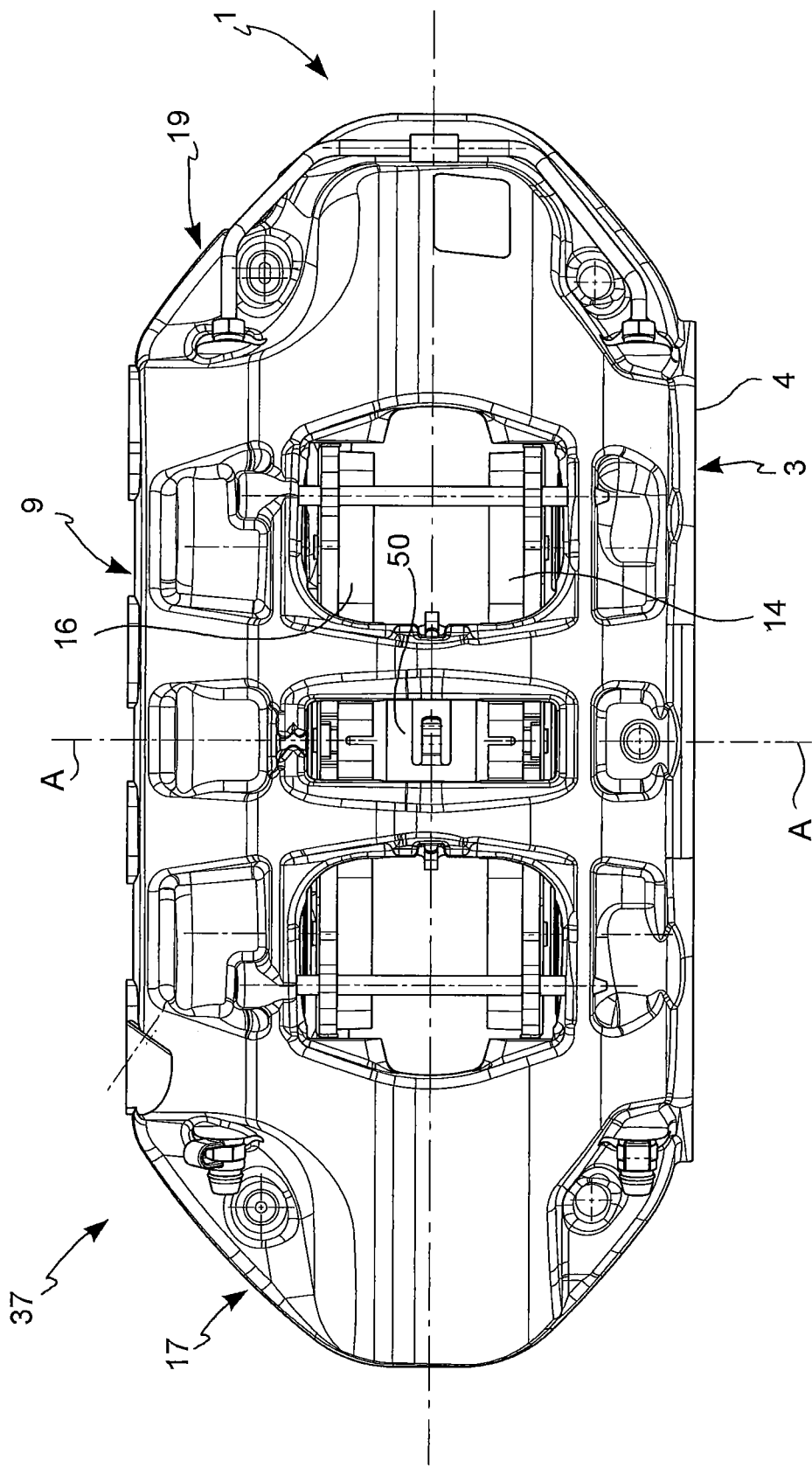
FIG. 12 shows a top view of the caliper in FIG. 11.
Figure 13:
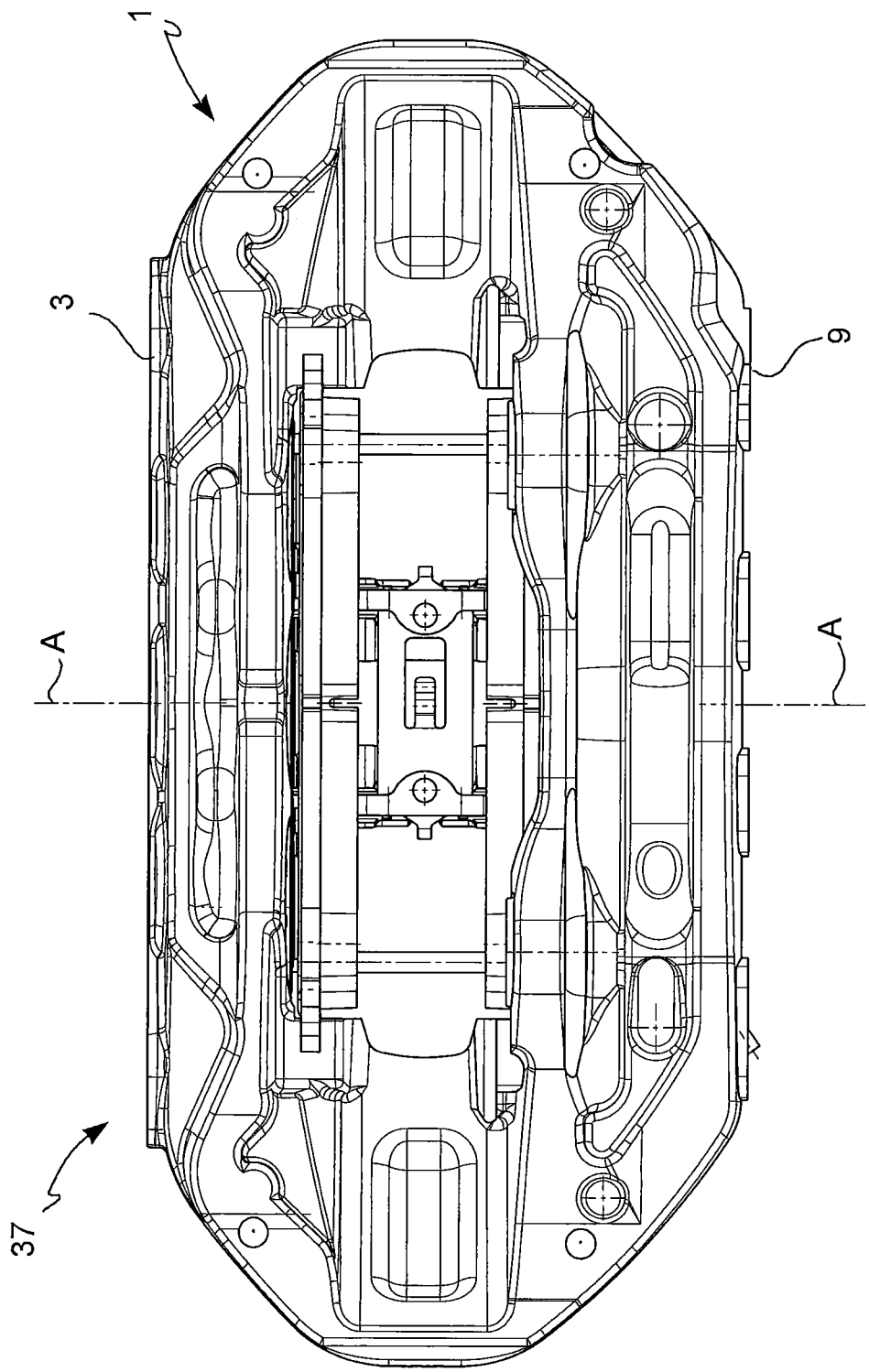
FIG. 13 shows a bottom view of the caliper in FIG. 11.
Figure 14:
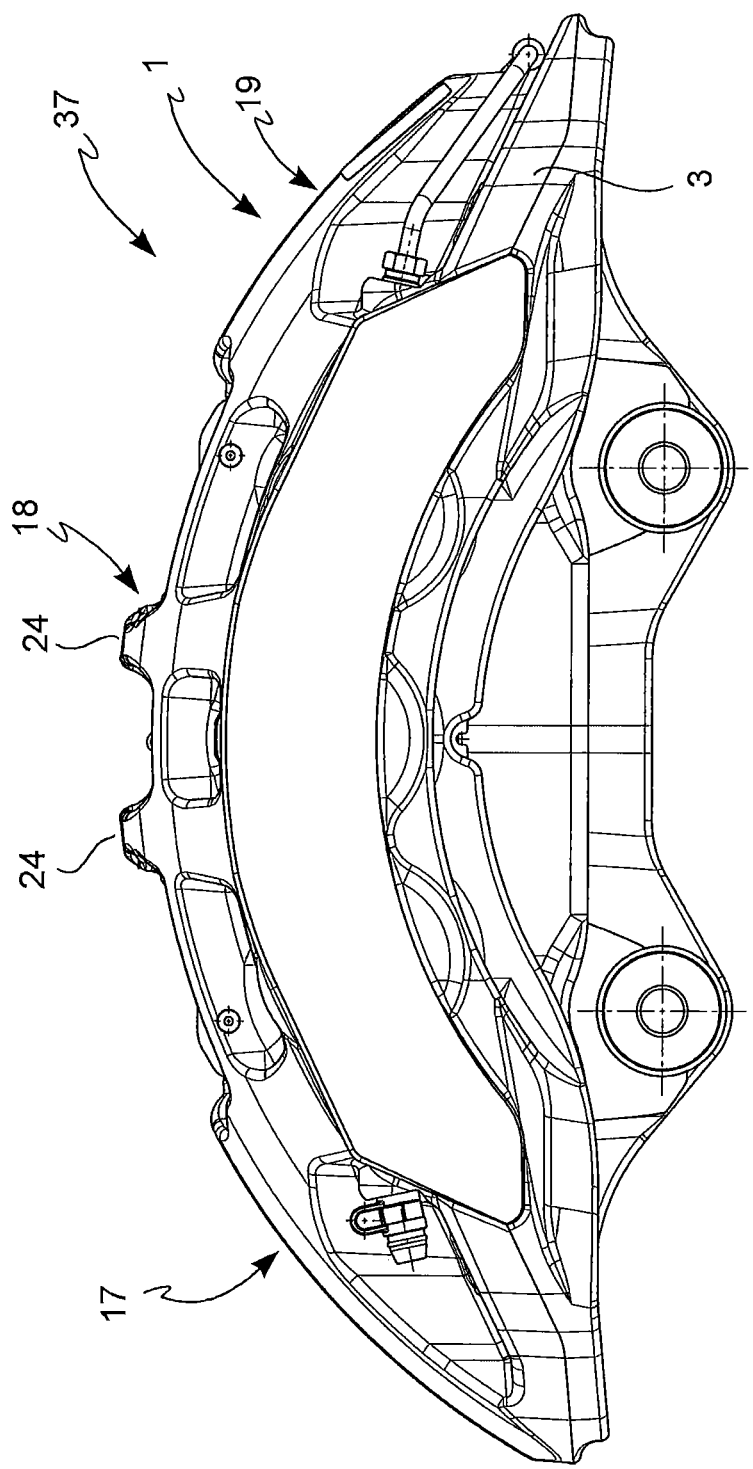
FIG. 14 shows a side view of the caliper in FIG. 11.
Figure 15:
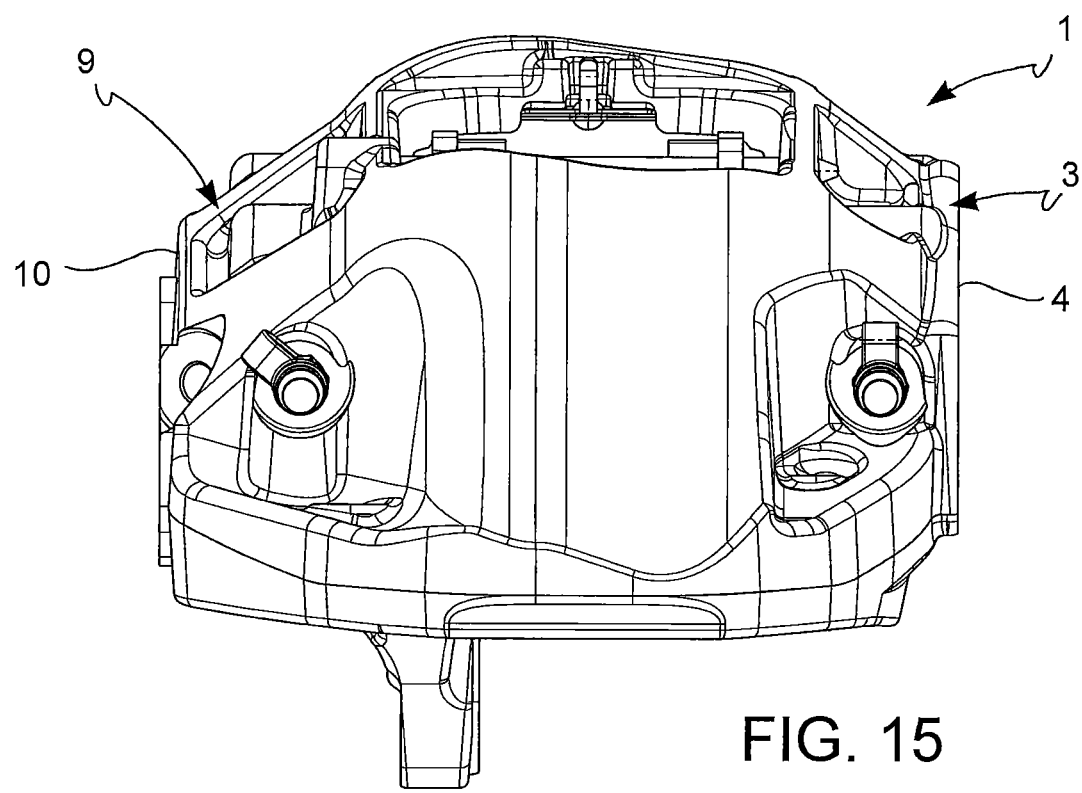
FIG. 15 shows a front view of the brake caliper in FIG. 11.
Figure 16:
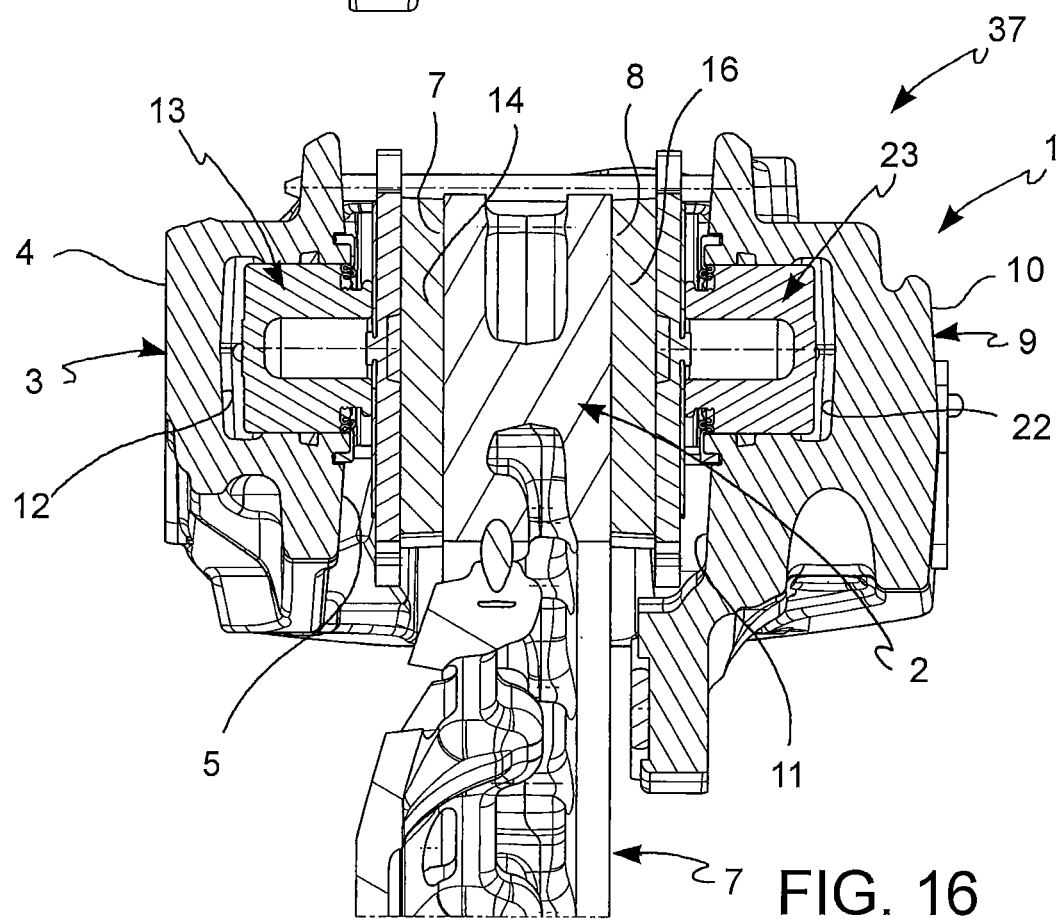
FIG. 16 shows a sectional view, by means of a sectional plane parallel to an axial plane, of a disc brake comprising the brake caliper in FIG. 11, during a braking action, passing through two opposite pad actuating pistons.
Figure 17:
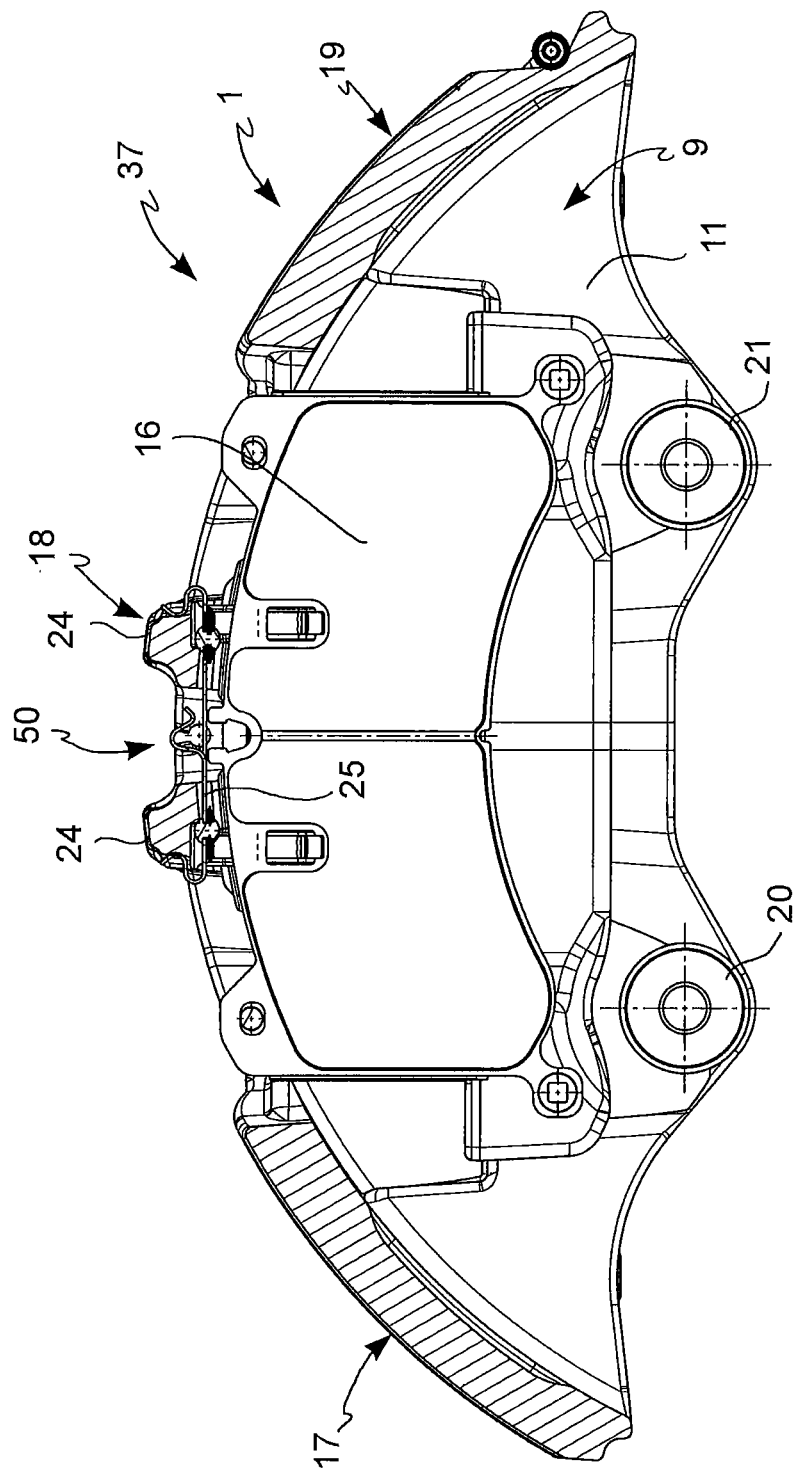
FIG. 17 shows a sectional view of a brake caliper in FIG. 11, by means of a sectional plane orthogonal to the axial and median direction with respect to the brake caliper.
Figure 18:
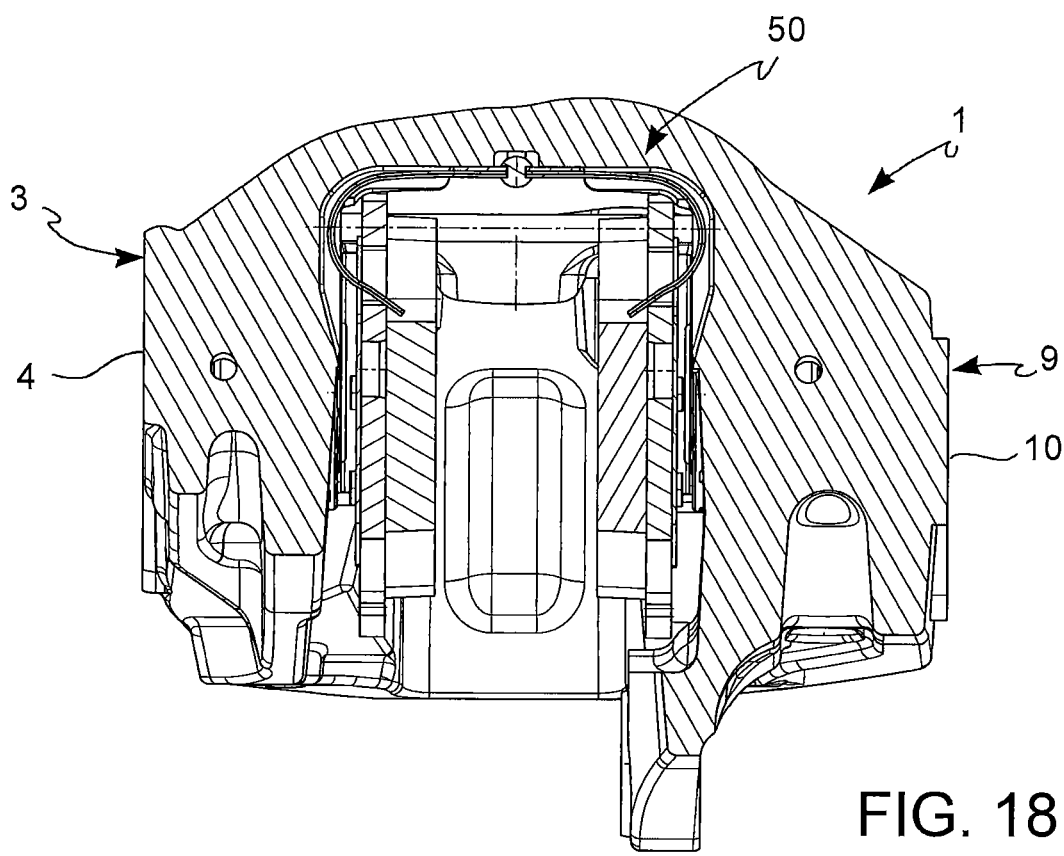
FIG. 18 shows a sectional view of the caliper in FIG. 11, by means of an axial plane passing through the caliper return spring, in which the pads are in retracted resting non-braking position.
Figure 19:
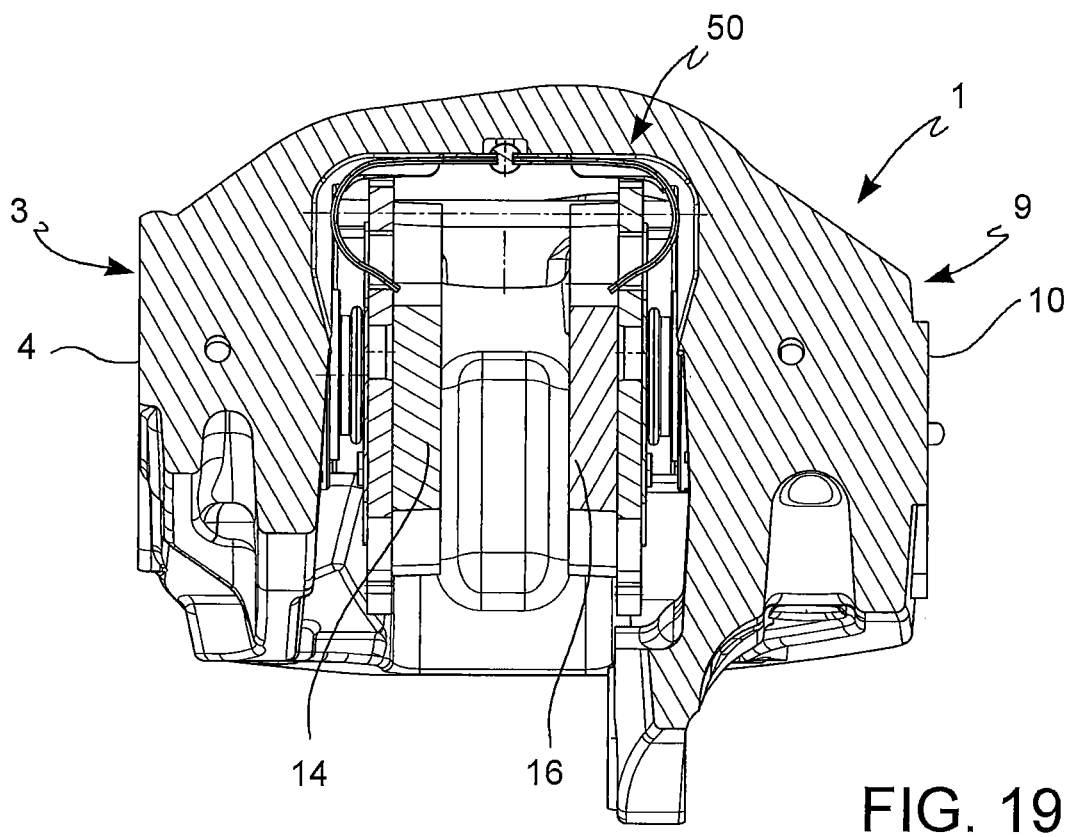
FIG. 19 shows the sectional view in FIG. 18, in which the pads are pressed against the friction surfaces of the brake disc during a braking action.

With reference to the figures, a pad return spring according to the invention for a disc brake caliper body 1 is indicated as a whole by numeral 50.

Said disc brake caliper body 1 is adapted to straddle a brake disc 2 of the floating type.

Said brake disc 2 comprises a first braking surface 7 of brake disc and an opposite second braking surface 8 of brake disc.

Said caliper body 1 comprises a first elongated wheel-side element 3. Said first elongated wheel-side element 3 comprises an outer caliper side 4 of first elongated element and an inner caliper side 5 of first elongated element. Said outer caliper side 4 of first elongated element is adapted to face a vehicle wheel. At least one portion of the inner caliper side 5 of first elongated element is adapted to directly or indirectly face said first braking surface 7 of brake disc by means of a first pad 14.

Said caliper body 1 comprises a second elongated opposite wheel-side element 9. Said second elongated opposite wheel-side element 9 comprises an outer caliper side 10 of second elongated element and an inner caliper side 11 of second elongated element. At least one portion of the inner caliper side 11 of second elongated element is adapted to directly or indirectly face said second braking surface 8 of brake disc by means of a second opposite pad 16.

A "second elongated opposite wheel-side element" and a "first elongated wheel-side element" mean a second element which is adapted to be connected to connection portions adapted to the connection of the caliper body to a support element for supporting the caliper, e.g. a wheel hub, while a first elongated element means a first element opposite to said second element. Therefore, "second elongated opposite wheel-side element" or "elongated element which is connectable to the support" is indifferently used later, as well as "first elongated wheel-side element" or "elongated element opposite to the support" is indifferently used later. Indeed, for example, this caliper may be used in a vehicle where the "first elongated wheel-side element" faces the wheel of the motor vehicle, but also in applications such as for example snowmobiles, but not necessarily only these, where the "first elongated wheel-side element" is an "elongated element opposite to the support" not facing any vehicle wheel, but having the same essential features.

Said first elongated wheel-side element 3 comprises at least one thrust means seat 12 adapted to receive thrust means 13 which are suitable for influencing the first pad 14 against said first braking surface 7 of brake disc.

Said caliper body 1 comprises at least one elongated elements connecting bridge 17, 18, 19 adapted to connect said first elongated wheel-side element 3 to said second elongated opposite wheel-side element 9 so as to be suitable for straddling said brake disc 2.

Advantageously, said second elongated opposite wheel-side element 9 comprises at least two portions, each defining a connecting seat 20, 21 adapted to connect the caliper body 1 to a support element for supporting the caliper on a wheel hub.

According to an alternative embodiment, said first and second end bridge 17, 19 extend so as to straddle the brake disc 2 according to an axial direction A-A which substantially is parallel to the rotation axis of the brake disc, and said connecting seats 20, 21 are aligned with said end bridges 17, 19 and extend according to an axial direction A-A.

According to an alternative embodiment, there is comprised a first disc inlet end bridge 17 and a second disc outlet end bridge 19 and said at least two portions each defining a connecting seat 20, 21 are provided at said first and second end bridge 17, 19.

According to an alternative embodiment, said at least two portions each defining a connecting seat 20, 21 form at least two resting connecting surfaces, for example surfaces parallel to a plane which extends according to a radial direction R-R, which is transverse to the rotation axis of disc A-A.

According to an alternative embodiment, said connecting seats 20, 21 are aligned with said end bridges 17, 19 and extend according to a radial direction R-R or parallel to a radial axis and parallel to each other.

The at least one elongated element connecting bridge 17, 18, 19 comprises a middle connecting bridge 18 which extends according to the axial direction A-A and defines an outer middle bridge side 24 externally facing the caliper body, an inner middle bridge side 25 internally facing the caliper body, opposite to the outer middle bridge side 24, a middle bridge disc inlet side 26, a middle bridge disc outlet side 27, opposite to the middle bridge disc inlet side 26.

The pad return spring 50 comprises a first pad retraction element 61 and a second pad retraction element 62, each of said first pad retraction element 61 and second pad retraction element 62 defining a middle stretch 58, 59, a first side stretch 54, 55 adapted to influence said first pad 14, and an opposite second side stretch 56, 57 adapted to influence said second opposite pad 16 to move said first pad 14 and said second opposite pad 16 away from said first braking surface 7 of brake disc and from said opposite second braking surface 8 of brake disc at the end of a braking action.

The first pad retraction element 61 and the second pad retraction element 62 are shaped as a folded band and consist of a plurality of overlapping sandwiched sheet layers 61', 61", 62', 62".

The spring comprises an elongated connecting element 63 which connects the first pad retraction element 61 and the second pad retraction element 62 to each other at said middle stretch 58, 59.

The spring comprises anchoring means 51, 52, 53 adapted to removably restrain said pad return spring 50 to said middle connecting bridge 18.

According to an embodiment, each of said first pad retraction element 61 and second pad retraction element 62 is a leaf spring.

According to an embodiment, the first side stretch 54, 55 and the second side stretch 56, 57 of each of said first pad retraction element 61 and second pad retraction element 62 comprise, or consist of, respective portions folded preferably as an arc of circle with concavities facing one another.

According to an embodiment, the first side stretch 54, 55 ends with a respective first free end 54', 55' and the second side stretch 56, 57 ends with a second free end 56', 57', in which said first free end 54', 55' and said second free end 56', 57' are preferably folded towards the outside of said first pad retraction element 61 and said second pad retraction element 62.

According to an embodiment, the first free end 54', 55' and the second free end 56', 57' are flat inclined portions lying on a first and a second plane C, D, respectively, which are incident to each other according to a preset angle α.

According to an embodiment, the preset angle α preferably is comprised between 90° and 135°, even more preferably is about 120°.

According to an embodiment, the middle stretch 58, 59 of each of said first pad retraction element 61 and second pad retraction element 62 is flat or substantially flat.

According to an embodiment, each of said first pad retraction element 61 and second pad retraction element 62 has a symmetrical shape with respect to a median symmetry plane S-S, and in which said first pad retraction element 61 and said second pad retraction element 62 substantially are equal to each other.

According to an embodiment, each layer of said plurality of overlapping sheet layers 61', 61", 62', 62" in each of said first pad retraction element 61 and said second pad retraction element 62 has a length evaluated according to a main extension direction thereof, which is different from the adjacent layers.

According to an embodiment, each of said first pad retraction element 61 and second pad retraction element 62 consists of an outer sheet layer 61', 62' and of an inner sheet layer 61", 62".

According to an embodiment, the outer sheet layer 61', 62' is greater in length than the inner sheet layer 61", 62", which lengths are evaluated along a main extension direction of said first pad retraction element 61 and said second pad retraction element 62, thus projecting with respect to the ends of said inner sheet layer 61", 62".

According to an embodiment, the inner sheet layer 61", 62" partially covers the outer sheet layer 61', 62' at said first free end 54', 55' of said first pad retraction element 61 and at a second free end 56', 57' of said second pad retraction element 62.

According to an embodiment, the elongated connecting element 63 defines a first connecting element end 66 and an opposite second connecting element end 67, in which the first connecting element end 66 is connected to the middle portion 58 of the first retraction element 61 by means of first fastening means 68, and in which the second connecting element end 63 is connected to the middle portion 59 of the second retraction element 62 by means of second fastening means 69.

According to an embodiment, the first fastening means 68 and the second fastening means 69 comprise anti-rotation constraints 72, 73 to prevent the rotation of the first retraction element 61 and of the second retraction element 62 with respect to the connecting element 63.

According to an embodiment, the connecting element 63 comprises a sheet body 65 partially overlapping the middle portion 58 of the first retraction element 61 and the middle portion 59 of the second retraction element 62.

According to an embodiment, the first fastening means 68 and the second fastening means 69 each comprise a respective pin 70, 71, or a rivet, passing through said sheet body 65 and said first retraction element (61) and second retraction element (62).

According to an embodiment, the anti-rotation constraints 72, 73 comprise pairs of anti-rotation tabs protruding from the opposite free ends 66, 67 of said sheet body 65 and folded to be abuttingly engaged against an outer side of the first retraction element 61 and against an outer side of the second retraction element 62, respectively.

According to an embodiment, each of the first fastening means 68 and second fastening means 69 is interposed between the anti-rotation tabs 72, 73 of each pair of anti-rotation tabs, respectively.

According to an embodiment, said anchoring means 51, 52, comprise two opposite anchoring tabs 51, 53 adapted to be snappingly engaged with said middle bridge disc inlet side 26 and with said middle bridge disc outlet side 27, respectively. According to an embodiment, said end tabs are folded in the shape of opposed "S".

According to an embodiment, said two opposite anchoring tabs 51, 53 extend as extensions from opposite ends of the sheet body 65.

According to an embodiment, each of said two opposite anchoring tabs 51, 53 is interposed between the anti-rotation tabs of each pair of anti-rotation tabs 72, 73, respectively.

According to an embodiment, the anchoring means 51, 52, 53 comprise a middle anchoring tab 52 centrally protruding from said connecting element 63, adapted to be engaged with a pad wear signaling cable.

According to an embodiment, the middle anchoring tab 52 is made in one piece from a middle sheet portion 65.

The aforesaid objects are met by a brake caliper 37 comprising the above-described pad return spring 50.

The disc brake caliper body 37 comprises a disc brake caliper body 1 adapted to straddle a brake disc 2, sad brake disc comprising a first braking surface 7 of brake disc and an opposite second braking surface 8 of brake disc.

The caliper body 1 comprises a first elongated wheel-side element 3, which comprises an outer caliper side 4 of first elongated element and an inner caliper side 5 of first elongated element, in which said outer caliper side 4 of first elongated element is adapted to face a vehicle wheel and in which at least one portion of the inner caliper side 5 of first elongated element is adapted to face said first braking surface 7 of brake disc by means of a first pad 14.

The caliper body 1 comprises a second elongated opposite wheel-side element 9 comprising an outer caliper side 10 of second elongated element and an inner caliper side 11 of second elongated element, in which at least one portion of the inner caliper side 11 of second elongated element is adapted to face said second braking surface 8 of brake disc by means of a second opposite pad 16.

The first elongated wheel-side element 3 comprises at least one thrust means seat 12 adapted to receive thrust means 13 which are suitable for influencing the first pad 14 against said first braking surface 7 of brake disc.

At least said second elongated opposite wheel-side element 9 comprises at least two portions each defining a connecting seat 20, 21 adapted to connect the caliper body 1 to a support element for supporting the caliper on the vehicle.

The caliper body 1 comprises at least one elongated element connecting bridge 17, 18, 19 adapted to connect said first elongated wheel-side element 3 to said second elongated opposite wheel-side element 9 so as to be suitable for straddling said brake disc 2.

The at least one elongated element connecting bridge 17, 18, 19 comprises a middle connecting bridge 18 which extends according to the axial direction A-A and defines an outer middle bridge side 24 externally facing the caliper body, an inner middle bridge side 25 internally facing the caliper body, opposite to the outer middle bridge side 24, a middle bridge disc inlet side 26, a middle bridge disc outlet side 27, opposite to the middle bridge disc inlet side 26.

The disc brake caliper 37 comprises a pad return spring 50 as described above.

Such a pad return spring 50 comprises a first pad retraction element 61 and a second pad retraction element 62, each of said first pad retraction element 61 and second pad retraction element 62 defining a middle stretch 58, 59, a first side stretch 54, 55 adapted to influence said first pad 14, and an opposite second side stretch 56, 57 adapted to influence said second pad 16, to move away from said first braking surface 7 of brake disc and from said opposite second braking surface 8 of brake disc at the end of a braking action.

Each of said first pad retraction element 61 and said second pad retraction element 62 is shaped as a folded band and consists of a plurality of overlapping sandwiched sheet layers 61', 61", 62', 62".

Spring 50 comprises an elongated connecting element 63 which connects the first pad retraction element 61 and a second pad retraction element 62 to each other at said middle stretch 58, 59.

Spring 50 comprises anchoring means 51, 52, 53 configured to removably restrain said pad return spring 50 to said middle connecting bridge 18.

According to an embodiment, the pad return spring 50 is manufactured according to any one of the above-described features.

According to an embodiment, said first side stretch 54, 55 and said opposite second side stretch (56, 57) are configured to be accommodated in corresponding through openings 81, 82 of said first pad 14 and said second opposite pad 16.

According to an embodiment, said caliper body 1 is of fixed type, in which said second elongated opposite wheel-side element 9 comprises at least one thrust means seat 22 adapted to receive thrust means 23 which are suitable for influencing the second pad 16 against said second braking surface 8 of brake disc.

Those skilled in the art may make many changes and adaptations to the embodiments described above or can replace elements with others which are functionally equivalent in order to meet contingent and specific needs without however departing from the scope of the appended claims.

All the features herein described may be combined according to any combination, except the combinations in which at least some of such features mutually exclude one another.

The invention claimed is:

1. A pad return spring for a disc brake caliper body configured to straddle a brake disc, said brake disc comprising a first braking surface of brake disc and an opposite second braking surface of brake disc, said disc brake caliper body comprising:

a first elongated wheel-side element comprising an outer caliper side of first elongated wheel-side element and an inner caliper side of first elongated wheel-side element, wherein said outer caliper side of first elongated wheel-side element is suitable for facing a vehicle wheel and wherein at least one portion of the inner caliper side of first elongated wheel-side element is suitable for facing said first braking surface of brake disc by a first pad; and a second elongated opposite wheel-side element comprising an outer caliper side of second elongated wheel-side element and an inner caliper side of second elongated wheel-side element, wherein at least one portion of the inner caliper side of second elongated wheel-side element is suitable for facing said second braking surface of brake disc by a second opposite pad;

said first elongated wheel-side element comprising at least one thrust means seat configured to receive thrust means configured to influence the first pad against said first braking surface of brake disc;

at least said second elongated opposite wheel-side element comprising at least two portions each defining a connecting seat configured to connect the disc brake caliper body to a support element for supporting the disc brake caliper body on the vehicle;

said disc brake caliper body further comprising at least one elongated element connecting bridge configured to connect said first elongated wheel-side element to said second elongated opposite wheel-side element so as to be suitable for straddling said brake disc;

said at least one elongated element connecting bridge comprising a middle connecting bridge which extends according to axial direction (A-A) and defines an outer middle bridge side externally facing the disc brake caliper body, an inner middle bridge side internally facing the disc brake caliper body, opposite to the outer middle bridge side, a middle bridge disc inlet side, a middle bridge disc outlet side, opposite to the middle bridge disc inlet side;

said pad return spring comprising a first pad retraction element and a second pad retraction element, each of said first pad retraction element and second pad retraction element defining a middle stretch, a first side stretch configured to influence said first pad, and an opposite second side stretch configured to influence said second opposite pad to move away said first pad and said second opposite pad from said first braking surface of brake disc and from said opposite second braking surface of brake disc at the end of a braking action;

wherein said first pad retraction element and said second pad retraction element are shaped as a folded band and comprise a plurality of overlapping sandwiched sheet layers;

said pad return spring further comprising an elongated connecting element which connects the first pad retraction element and the second pad retraction element to each other at said middle stretch;

said pad return spring further comprising anchoring means configured to removably restrain said pad return spring to said middle connecting bridge.

2. The pad return spring of claim 1, wherein the elongated connecting element defines a first connecting element end and an opposite second connecting element end, wherein the first connecting element end is connected to the middle stretch of the first pad retraction element by first fastening means, and wherein the opposite second connecting element end is connected to the middle stretch of the second pad retraction element by second fastening means, wherein the first fastening means and the second fastening means comprise anti-rotation constraints to prevent rotation of the first pad retraction element and of the second pad retraction element with respect to the elongated connecting element.

3. The pad return spring of claim 2, wherein the elongated connecting element comprises a sheet body partially overlapping the middle stretch of the first pad retraction element and the middle stretch of the second pad retraction element, and wherein the first fastening means and the second fastening means each comprise a respective pin, or rivet, passing through said sheet body and said pad first retraction element and second pad retraction element, and wherein the anti-rotation constraints comprise pairs of anti-rotation tabs protruding from the first connecting element end and the opposite second connecting element end of said sheet body and folded to be abuttingly engaged against an outer side of the first pad retraction element and against an outer side of the second pad retraction element, respectively.

4. The pad return spring of claim 3, wherein each of the first fastening means and second fastening means is interposed between the anti-rotation tabs of each pair of anti-rotation tabs, respectively.

5. The pad return spring of claim 1, wherein said anchoring means comprise two opposite anchoring tabs configured to be snappingly engaged with said middle bridge disc inlet side and with said middle bridge disc outlet side, respectively, said two opposite anchoring tabs being folded in shape of two opposed S.

6. The pad return spring of claim 5, wherein said two opposite anchoring tabs extend as extensions from opposite ends of the sheet body.

7. The pad return spring of claim 5, wherein the connecting element comprises a sheet body partially overlapping the middle stretch of the first retraction element and the middle stretch of the second retraction element, and wherein the first fastening means and the second fastening means each comprise a respective pin, or rivet, passing through said sheet body and said first retraction element and second retraction element, and wherein the anti-rotation constraints comprise pairs of anti-rotation tabs protruding from the first connecting element end and the opposite second connecting element end of said sheet body and folded to be abuttingly engaged against an outer side of the first retraction element and against an outer side of the second retraction element, respectively, and wherein each of said two opposite anchoring tabs is interposed between the anti-rotation tabs of each pair of anti-rotation tabs, respectively.

8. The pad return spring of claim 1, wherein the first side stretch ends with a respective first free end and the opposite second side stretch ends with a second free end, wherein said first free end and said second free end are folded towards outside of said first pad retraction element and said second pad retraction element.

9. The pad return spring of claim 8, wherein said first free end and said second free end are flat inclined portions lying on a first plane and a second plane (C, D), respectively, which are incident to each other according to a preset angle ($\alpha$).

10. The pad return spring of claim 1, wherein each of said first pad retraction element and second pad retraction element comprise an outer sheet layer and an inner sheet layer, wherein the outer sheet layer is greater in length than the inner sheet layer, lengths being evaluated along a main extension direction of said first pad retraction element and said second pad retraction element, projecting with respect to ends of said inner sheet layer.

11. The pad return spring of claim 10, wherein the first side stretch ends with a respective first free end and the opposite second side stretch ends with a second free end, wherein said first free end and said second free end are folded towards outside of said first pad retraction element and said second pad retraction element, and wherein the inner sheet layer partially covers the outer sheet layer at said first free end of said first pad retraction element and at said second free end of said second pad retraction element.

12. The pad return spring of claim 1, wherein the anchoring means comprise a middle anchoring tab centrally protruding from said elongated connecting element, configured to be engaged with a pad wear signaling cable.

13. The pad return spring of claim 12, wherein the middle anchoring tab is made in one piece from a middle sheet portion.

14. The pad return spring of claim 1, wherein each of said first pad retraction element and second pad retraction element is a leaf spring.

15. The pad return spring of claim 1, wherein the first side stretch and the opposite second side stretch of each of said first pad retraction element and second pad retraction element comprise respective portions folded as an arc of circle with concavities facing one another.

16. The pad return spring of claim 1, wherein the middle stretch of each of said first pad retraction element and second pad retraction element is flat or substantially flat.

17. The pad return spring of claim 1, wherein each of said first pad retraction element and second pad retraction element has a symmetrical shape with respect to a median symmetry plane (S-S), and wherein said first pad retraction element and said second pad retraction element are equal to each other.

18. The pad return spring of claim 1, wherein each layer of said plurality of overlapping sheet layers in each of said first pad retraction element and said second pad retraction element has a length evaluated according to a main extension direction thereof, which is different from adjacent layers.

19. A disc brake caliper comprising:
a disc brake caliper body configured to straddle a brake disc, said brake disc comprising a first braking surface of brake disc and an opposite second braking surface of brake disc, said disc brake caliper body comprising:
a first elongated wheel-side element comprising an outer caliper side of first elongated wheel-side element and an inner caliper side of first elongated wheel-side element, wherein said outer caliper side of first elongated wheel-side element is suitable for facing a vehicle wheel and wherein at least one portion of the inner caliper side of first elongated wheel-side element is suitable for facing said first braking surface of brake disc by a first pad; and
a second elongated opposite wheel-side element comprising an outer caliper side of second elongated wheel-side element and an inner caliper side of second elongated wheel-side element, wherein at least one portion of the inner caliper side of second elongated wheel-side element is suitable for facing said second braking surface of brake disc by a second opposite pad;

said first elongated wheel-side element comprising at least one thrust means seat configured to receive thrust means configured to influence the first pad against said first braking surface of brake disc;

at least said second elongated opposite wheel-side element comprising at least two portions each defining a connecting seat configured to connect the disc brake caliper body to a support element for supporting the disc brake caliper body on the vehicle;

said disc brake caliper body further comprising at least one elongated element connecting bridge configured to connect said first elongated wheel-side element to said second elongated opposite wheel-side element so as to be suitable for straddling said brake disc;

said at least one elongated element connecting bridge comprising a middle connecting bridge which extends according to axial direction (A-A) and defines an outer middle bridge side externally facing the disc brake caliper body, an inner middle bridge side internally facing the disc brake caliper body, opposite to the outer middle bridge side, a middle bridge disc inlet side, a middle bridge disc outlet side, opposite to the middle bridge disc inlet side;

wherein said disc brake caliper comprises:

a pad return spring comprising a first pad retraction element and a second pad retraction element, each of said first pad retraction element and second pad retraction element defining a middle stretch, a first side stretch configured to influence said first pad, and an opposite second side stretch configured to influence said second pad, to move away from said first braking surface of brake disc and from said opposite second braking surface of brake disc at the end of a braking action;

wherein each of said first pad retraction element and said second pad retraction element is shaped as a folded band and comprises a plurality of overlapping sandwiched sheet layers;

said pad return spring further comprising an elongated connecting element which connects the first pad retraction element and the second pad retraction element to each other at said middle stretch;

said pad return spring further comprising anchoring means configured to removably restrain said pad return spring to said middle connecting bridge.

20. The disc brake caliper of claim 19, wherein each of said first pad retraction element and second pad retraction element of said pad return spring is a leaf spring.

21. The disc brake caliper of claim 19, wherein said first side stretch and said opposite second side stretch are configured to be accommodated in corresponding through openings of said first pad and said second opposite pad.

22. The disc brake caliper of claim 19, wherein said disc brake caliper body is of fixed type, wherein said second elongated opposite wheel-side element comprises at least one thrust means seat configured to receive thrust means suitable for influencing the second pad against said second braking surface of brake disc.

* * * * *